Figure 1:
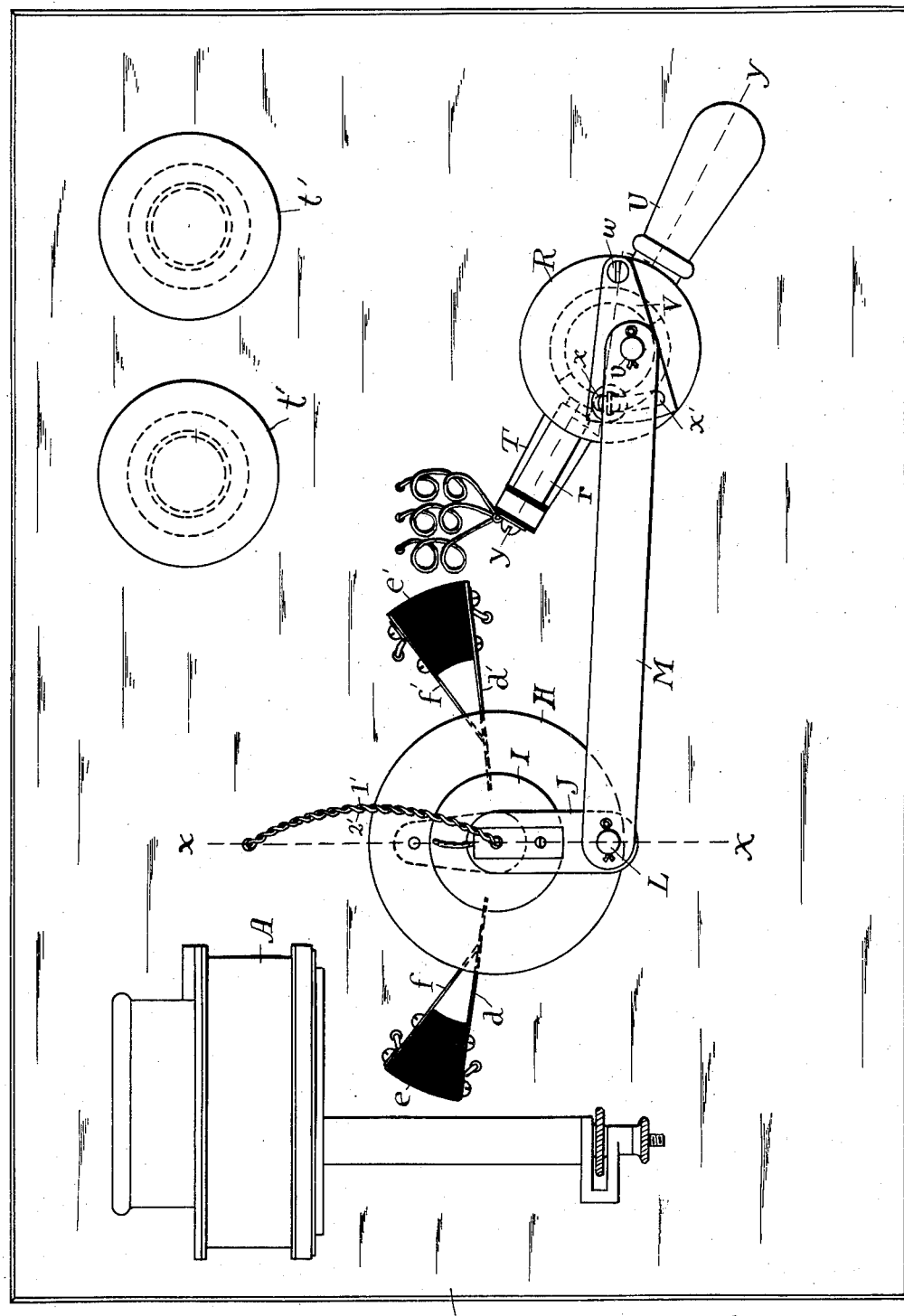

W. H. CHAPMAN.
REGULATOR FOR DYNAMOS.
APPLICATION FILED MAY 14, 1909.

1,027,101.

Patented May 21, 1912.

4 SHEETS—SHEET 1.

Witnesses:
Percy M. Andrews,
E. W. Dennis

Inventor:
William H. Chapman
by S. W. Bates
Atty.

W. H. CHAPMAN.
REGULATOR FOR DYNAMOS.
APPLICATION FILED MAY 14, 1909.
1,027,101.
Patented May 21, 1912.
4 SHEETS—SHEET 2.
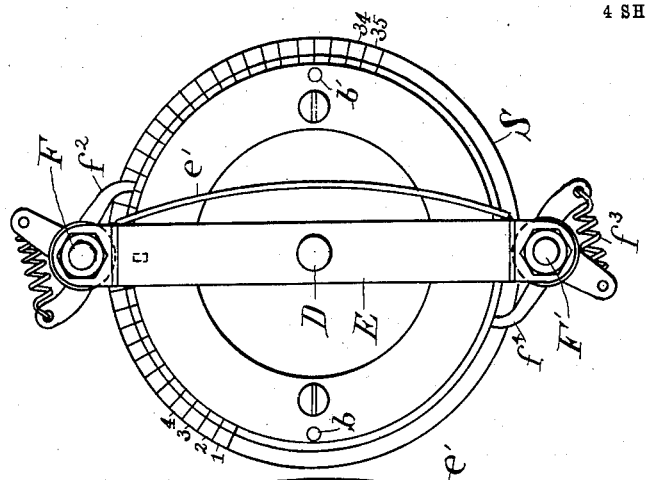
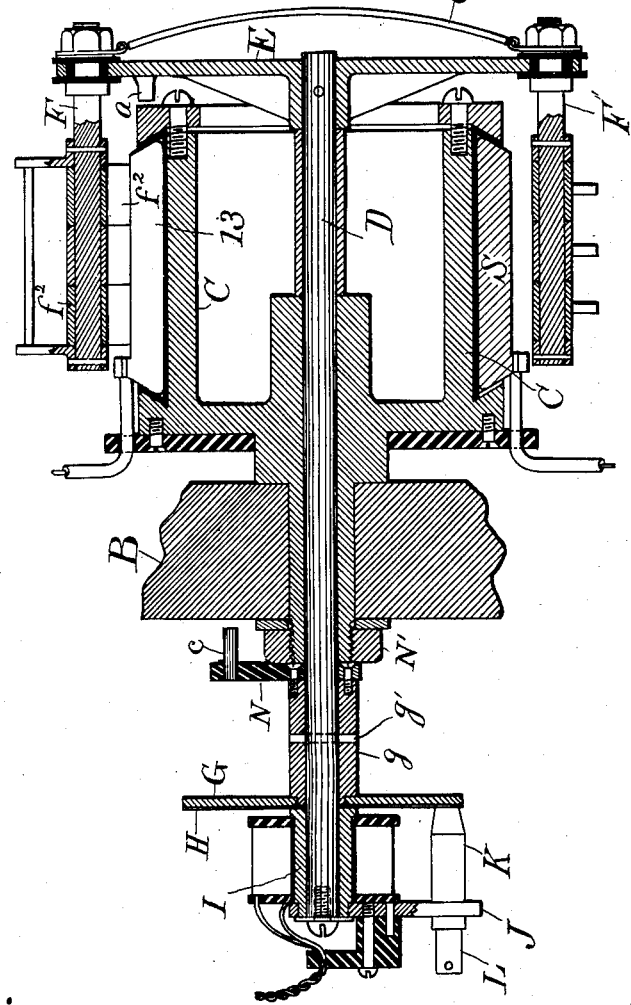
Witnesses:
Percy M. Andrews.
E. W. Dennis
Inventor:
William H. Chapman
by S. W. Bates
Atty.

W. H. CHAPMAN.
REGULATOR FOR DYNAMOS.
APPLICATION FILED MAY 14, 1909.

1,027,101.

Patented May 21, 1912.
4 SHEETS—SHEET 3.

Witnesses:
Percy M. Andrews.
E. W. Dennis

Inventor:
William H. Chapman
by S. W. Bates
Atty.

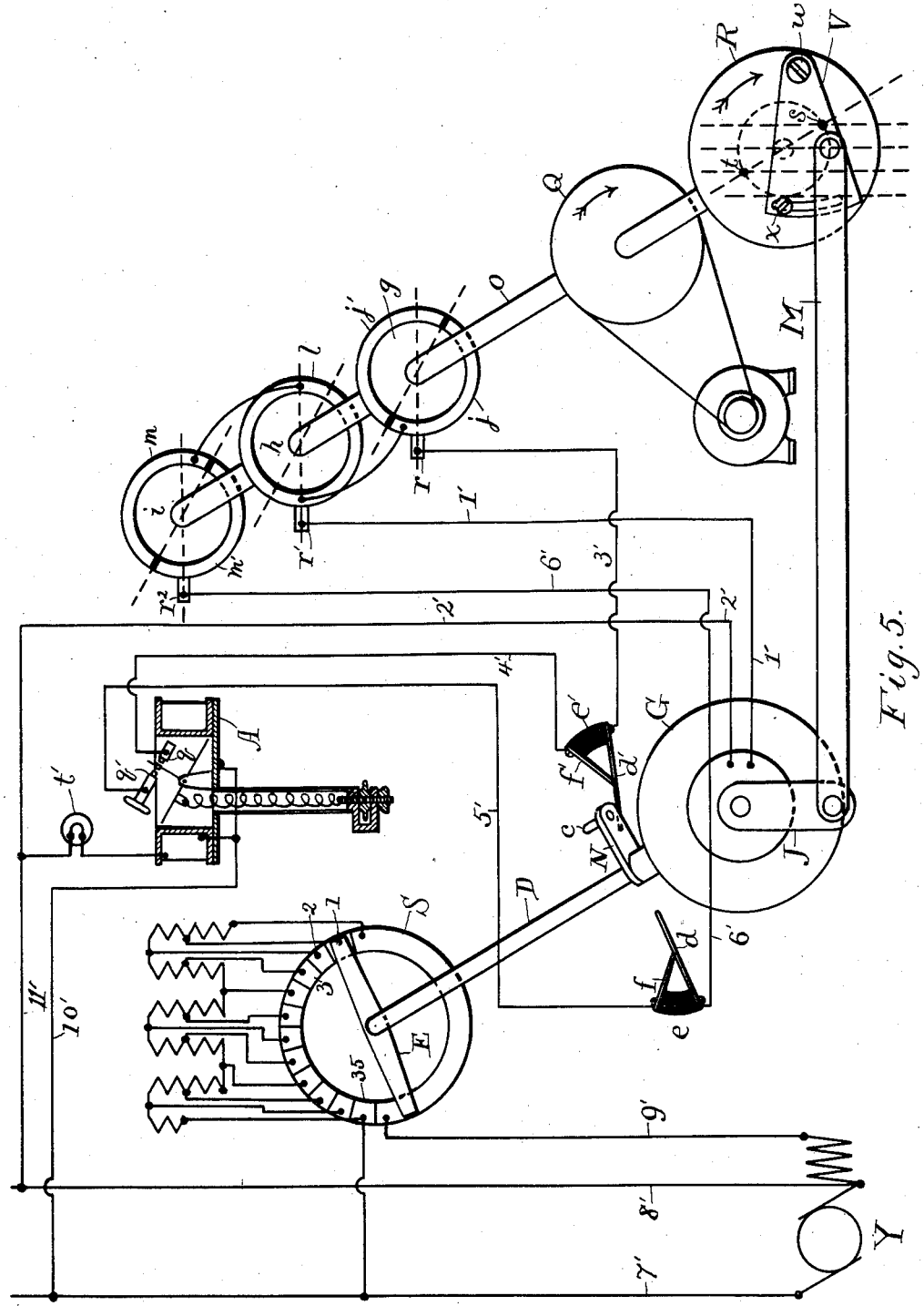

UNITED STATES PATENT OFFICE.

WILLIAM H. CHAPMAN, OF PORTLAND, MAINE.

REGULATOR FOR DYNAMOS.

1,027,101.

Specification of Letters Patent.

Patented May 21, 1912.

Application filed May 14, 1909. Serial No. 495,870.

*To all whom it may concern:*

Be it known that I, WILLIAM H. CHAPMAN, a citizen of the United States of America, and a resident of Portland, in the county of Cumberland, State of Maine, have invented certain new and useful Improvements in Regulators for Dynamos, of which the following is a specification.

My invention relates to electric current or voltage regulators of that class in which a rheostat is applied to the field magnet circuit of a dynamo and by varying the exciting current of the field regulates the total output of the machine for constant voltage or constant current.

The invention is particularly applicable to large direct current dynamos although it is capable of use in other forms of dynamo.

Hitherto these dynamos have been commonly regulated by means of a rheostat placed in the field magnet circuit, means being provided by which the rheostat arm was automatically moved one way or the other as the current fell below or rose above the required standard. Such a device was shown in my Patent No. 648,388, issued May 1, 1900. In this device the rheostat arm was moved in one direction or the other by a pair of solenoids, the current being directed through one or the other by means of a relay having a low voltage contact and a high voltage contact. The difficulty with this and similar systems is that it is limited in its quickness of action by the rate at which the field magnet can change its strength or magnetic flux in response to the gradual change of the rheostat. It is necessary to use a dash pot to produce slow movements of the solenoids and the rheostat, otherwise it would "hunt". What is needed in such devices is some means of forcing a quick change, some means of overcoming instantly the hysteresis of the field for it is well known that, particularly in large direct current generators, the difference between the rising hysteresis curve and the falling hysteresis curve is so great as to involve a movement over several segments of the rheostat to make any change at all. It is therefore manifestly desirable to secure the quickest possible movement of the rheostat arm over these segments and also to give a quick agitation movement beyond them so as to force a quick change.

The object of my invention is to provide automatic means for moving the rheostat in such a way as to overcome the hysteresis and time element of a field magnet by sudden agitation and to cause a quick response of the field to the required change. I accomplish this object by providing means by which the rheostat arm is moved in one direction or the other by a series of steps, each step consisting of a forward or advance movement extending over several segments and a retrograde movement which is less than the forward movement, resulting in a progressive vibratory action of the rheostat which has the effect of agitating the field of the dynamo and causing rapid changes therein. Such a movement overcomes the sluggishness of the field in a manner analogous to hastening the flow of heavy oil from a can by repeated pressures on its sides, or salt from a salt shaker when it is shaken or agitated.

My invention also provides means for quickly adjusting the extent of the agitation and also the relative amount of progressive movement of the rheostat arm for each step, thus obviating the need of any dash pot or dampening device.

I have designed certain apparatus by which the movements above described may be applied to the rheostat arm of a dynamo and while I have hereinafter particularly described this apparatus, it is to be understood that the movements of the rheostat may be produced by a great variety of mechanism and that what I have shown is illustrated as a practical embodiment of the invention.

Figure 3:
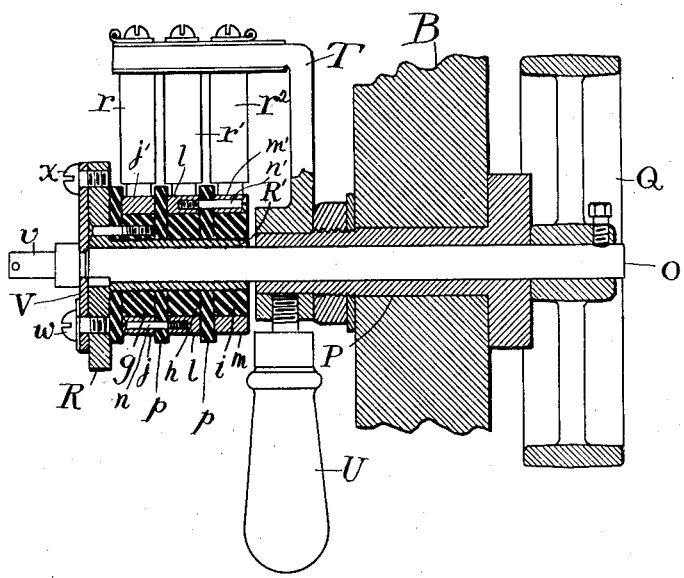

In the accompanying drawing, Figure 1 is a front elevation of a complete regulator mounted on a slate panel, Fig. 2 is a cross section of Fig. 1 on the line $x$ $x$, Fig. 3 is a cross section of Fig. 1 on the line $y$ $y$, Fig. 4 is a rear elevation of the rheostat arm and segments, and Fig. 5 is a diagram showing the mechanical and electrical connection of the parts.

Means are provided for swinging the rheostat arm one way or the other as the voltage falls below or rises above the desired standard. For the purpose of determining the direction of motion to be given to the arm, I make use of a relay or other similar device having a low voltage contact and a high voltage contact. As here shown, I make use of a relay as A like that shown and described in my Patent No. 648,388 and it is here shown as mounted on the front of the slate panel B. It performs the same functions as described in the said patent, being used to detect a change of voltage above or below the normal and to close one or the other of two electric circuits according as the voltage is high or low. It is provided with a high voltage contact $q$ and a low voltage contact $q'$. For the purpose of varying the resistance in the field magnet circuit, I make use of a rheostat, preferably cylindrical in form, with segments on its outer surface. As shown, the rheostat is formed of a cylinder shaped cast iron frame C mounted on the back of the panel B (Figs. 2 and 4.) On the surface of the cylinder are mounted a series of rheostat segments of metal S and 1, 2, 3, 4, etc., all insulated from each other and from the frame. One of these segments S occupies a little more than one half of the circumference of the cylinder, and the remainder of the circumference is occupied by the other segments.

The central hub of the frame extends beyond the end and passes through the slate and its end is screw threaded and has a nut N' to clamp the rheostat to the slate and to hold it firmly in place. Through the center of the hub is a hole in which the shaft D is journaled so as to turn freely. On the back end of the shaft and pinned thereto at its center, is the rheostat arm E carrying the studs F, F', one at each end. These studs are insulated from the lever by insulating bushings and washers, but are connected together by the wire $e'$. The stud F has three contact fingers $f^2$ in electrical connection with it and the stud F' has like fingers $f^4$ each of these fingers turning freely on its stud and being pressed into contact with the segments by springs $f^3$ so as to maintain a contact at all times with the rheostat segments. The fingers of the stud F touch the segments at a point diametrically opposite to those of the stud F'.

The arm E has a projecting lug $a$ which is adapted to strike the stop pins $b$ and $b'$ when the arm E has reached the limit of its range in either direction. One limit of its range is that position in which both sets of contact fingers are touching the large segment S and the other limit of its range is that position in which the fingers of the stud F are touching the last segment 35 with the fingers of the stud F' touching the segment S. The whole range of movement of the lever is just one half circle, and the fingers of the stud F' are always in contact with the segment S while those of the stud F make contact with every one of the segments in succession as the lever is moved from one extreme to the other. The segments, lever and contact fingers then constitute a rheostat of a well known type and the several segments may be connected to resistance wires or grids in the well known manner, and more or less of these resistances will be short circuited according to the position of the lever. When the lever is at that extreme where both sets of fingers are on the large segment S, the resistance is all in circuit, and at the other extreme the resistance is all short circuited.

Means are provided for imparting to the rheostat arm a progressive step by step motion in either direction, each step having a forward motion and a lesser retrograde motion. For this purpose I have provided a magnetic clutch one of whose clutch members is connected with the rheostat arm, the free clutch member having an oscillating motion imparted to it with means for engaging and disengaging said clutch to produce the vibratory motion of the rheostat arm above described. In the apparatus here shown the clutch is connected with the end of the shaft D the fixed clutch member being an iron disk G secured near the end of the shaft.

The disk G as here shown is secured to a hub $g$ which is in turn secured to the shaft by a pin $g'$. On the front face of the disk G is a disk H made of No. 34 hard rolled sheet copper. The free member of the magnetic clutch is formed as here shown by an iron sleeve I mounted and turning loosely on the end of the shaft D. To the sleeve I is secured the arm J preferably of iron having a projecting friction pin K also of iron of the same length as the sleeve I. The pin K is adapted to impinge against the copper disk H and by the use of the copper disk the pin is prevented from sticking after the circuit has been interrupted as would be the case if it acted directly against the iron disk G.

The sleeve I has a winding of fine magnet wire and forms together with the arm J friction pin K and disk G an electro-magnetic clutch. Means are provided for oscillating the free clutch member of the magnetic clutch to impart motion to the rheostat arm. For this purpose I secure on the front side of the arm J the crank pin L which receives the end of a connecting rod M. Means are provided for breaking the two circuits by which the magnetic clutch is energized as hereinafter shown when the arm E reaches its two limits of motion as described. For this purpose I show at the end of the hub $g$ of the disk G the fiber arm N having a pin $c$ which is adapted to contact with and disengage two circuit breakers one on each side of the shaft and to break the two magnet circuits as hereinafter set forth. These circuit breakers are composed as here shown of flat brass springs $d$ and $d'$ each mounted on a block of fiber $e$ and $e'$ respectively, the two fiber blocks being attached to the front of the slate panel and each normally in contact with another piece of spring brass $f, f'$. The blocks $e, e'$ are placed one on each side of the shaft so that when the shaft D is turned to either extreme of its movement, the pin $c$ pushes the corresponding spring $d$ or $d'$ away from contact with the contact piece $f$ or $f'$ (see Fig. 1).

Means are provided for reciprocating the connecting rod M to oscillate the free clutch member I and to make and break the circuits which energize the magnetic clutch to produce the uneven vibratory motion above described. For this purpose I make use of moving commutators for controlling the magnetic clutch circuits and having a regular rotary motion imparted by mechanical means independent of the current from the dynamo. These commutators are preferably in the form of rings mounted on a common rotating shaft which also serves to impart a reciprocating motion to the connecting rod and so to regularly oscillate the magnet I.

As ere shown the shaft O is journaled in the metal bushing P which passes through the slate. To the back end of the shaft is attached the pulley Q or other means of imparting rotation to the shaft. The pulley may be belted to an electric motor or any convenient source of power by which it may be kept in constant rotation. The front end of the shaft has a crank disk R attached to it with a hub R' on which are mounted three disks $g, h$ and $i$ of fiber or other insulating material. The disk $h$ has on its periphery a complete ring of brass $l$, while the disks $g$ and $i$ each have a split brass ring made up of two semi-circular segments of brass $j\ j'$ and $m\ m'$. One segment $j$ on the disk $g$ is connected electrically to the ring $l$ by a screw $n$ and one segment $m$ on the disk $j$ is similarly connected to the ring $l$ by screw $n'$ and this latter segment is located diametrically opposite to the former segment. The several brass rings are separated by insulating disks $p$. On the front end of the bushing P is mounted the lever T in the hub of which is a set screw having a wooden handle U. When the set screw is released the lever may be turned easily to any position.

The lever T is turned at its outer end to form an arm parallel with the shaft O and this arm supports three carbon brush holders $r, r'\ r^2$ which are insulated from it and from each other. These brush holders each have a carbon brush held in continuous contact with their respective brass rings, one carbon brush for each ring, and all arranged in a line parallel with the shaft. Connection is made between the connecting rod M and the crank disk R in such a manner as to vary the stroke of the connecting rod.

On the front side of the crank disk R is secured the sector shaped plate V having a crank pin $v$ riveted in it. The plate V is attached to the disk by two screws $w$ and $x$. The former passes through a hole at the center of the sector and serves as a pivot about which the sector may be turned for adjustment and the latter passes through a slot cut on the arc of a circle whose center is the screw $w$, and by this means the position of the crank pin may be adjusted from a point in line with the center of the shaft to a point at a considerable distance from the center so that any desired length of stroke may be obtained within the limits of the slot.

The connecting rod which communicates the motion of the crank to the arm J of the magnetic clutch being longer than the crank arm, is given a simple reciprocating motion of greater or less extent according to the distance at which the crank pin $v$ is adjusted out of center.

The arrangement of my apparatus is best understood by reference to the diagram Fig. 5 in which is shown the preferable manner of carrying out my invention. Referring to Fig. 5 Y is a shunt wound dynamo whose voltage it is desired to regulate, $7'$ and $8'$ being the line wires. The field magnet winding of this dynamo is connected to the rheostat of my regulator in the usual manner of connecting field rheostats. The relay of my regulator also is shown as connected to the main line wires by wires $10'$ and $11'$ from the dynamo in the usual manner of connecting a potential relay. It is usual to connect a lamp or other resistance device in series with the relay winding to reduce the temperature error and this is indicated at $t'$ in the diagram. The action of the relay is to admit current from the line to a low voltage contact $q'$, or a high voltage contact $q$, according as the voltage is lower or higher than the normal amount desired, and when the voltage is of normal amount, the relay is balanced and no current is admitted to either contact. The low voltage contact $q'$ is connected to carbon brush holder $r^2$ through line $5'$ the circuit breaker $d\ f$ and line $6'$ and the high voltage contact $q$ is connected to carbon brush holder $r$ through the line $4'$ circuit breaker $d'\ f'$ and line $3'$. The carbon brush holder $r'$ is connected to one end of the winding on the magnetic clutch by line $1'$ and the other end of this winding is connected by a line $2'$ to the side of the main line $8'$ which is opposite to that which goes to the relay contacts. It will thus be seen that the energizing of the magnetic clutch is dependent on three different sets of contacts; one at the relay, another at the circuit breakers $d$ or $d'$ and another at the segments $m$ or $j$ all of which must be closed in order to complete the circuit to energize the magnet. The shaft O is kept continually revolving at a rate preferably about 120 revolutions per minute. The segments $j$ and $m$ are therefore, alternately brought into connection with their respective brushes and brush holders $r$ and $r^2$ about 120 times per minute, and each time the connection is established during one half of a revolution and broken during the other half revolution, but the period during which connection is established at $m$ coincides with the period during which connection is broken at $j$. The point in the revolution at which each period begins is determined by the position of the brushes forward or backward with reference to the direction of rotation, and the position of the brushes is adjustable by setting the lever T, that supports the brushes, forward or backward. Thus the time at which a carbon brush crosses a slot from the dead segment to the live segment may be made to coincide with the time at which the crank is at the limit of its stroke or with the time at which it is at the middle of its stroke or at any intermediate point.

In the position of brushes shown on the diagram, the connection of segment $j$ with its brush begins when the crank is at $s$, about 30 degrees back of the middle of its stroke and ends when the crank is at $t$ about 30 degrees back of the middle of its return stroke thus producing a motion of the connecting rod and arm J in one direction during 120 degrees of rotation and a motion in the opposite direction during 60 degrees. On the other hand the connection of segment $m$ with its brush begins when the crank pin is at $t$ and ends when it is at $s$ so that the motion will be exactly the reverse of that described.

To illustrate the operation of the regulator, suppose the voltage of the line wires drops below normal, this causes the relay to close the contact at $q'$ admitting current through $f$ and $d$ to brush at $r^2$, then at each revolution of the shaft O a circuit is completed through segment $m$, ring $l$, brush holder $r'$, thence through the winding on the magnetic clutch and back to the other leg of the line. This current causes the pin K to press firmly against the copper faced disk G by virtue of the magnetic attraction established between the iron of the disk G and the iron pin, and this attraction lasts during the time that the crank pin is passing from the position $t$ around to the position S, 180 degrees total movement of the crank. During 120 degrees of this movement the disk G is, therefore, carried by friction in a direction counter-clockwise and during 60 degrees of the movement the disk G is carried in the opposite direction. The disk G, shaft D and rheostat lever are thus given a progressive movement and a retrograde movement at each revolution of the crank shaft, but the progressive movement exceeds the retrograde movement and each revolution leaves the rheostat arm at a position where it cuts out more and more of the resistance. When enough has been cut out to bring the voltage to normal the relay becomes balanced, contact at $q'$ is interrupted and the rheostat lever remains in a fixed position. Now on the other hand suppose the voltage rises above normal, contact is then made at $q$ admitting current through circuit breaker $f'$ $d'$ to brush holder $r$. Then at each revolution of the shaft O a circuit is completed through segment $j$, ring $l$, brush holder $r'$, thence through the winding of the magnetic clutch back to the other leg of the line. This current causes the magnetic clutch to engage during the time that the crank pin is passing from $s$ around to $t$. Thus disk G shaft D and rheostat lever are thereby given a movement just the reverse of the former movement and each revolution of the crank shaft leaves the rheostat lever at a position where more and more resistance is left in circuit and when enough has been put in to bring the voltage back again to normal, the relay again balances and the circuit is interrupted at $q$ and the rheostat arm remains stationary.

If for any cause the change of voltage on the line is more than the range of the rheostat, one or the other circuits is broken through the action of pin $c$ on the circuit breakers $d$ $f$ or $d'$ $f'$, otherwise the clutch would continue its efforts to turn the rheostat lever even after it has gone to its limit against the stop pins $b$ $b'$. The motion of the rheostat above described has the effect of agitating or "jogging up" the field and causing it to quickly change its strength or magnetic flux in response to changes in the exciting current resulting in a rapid change of voltage in the supply current from the machine.

It will readily be seen that the total movement of the rheostat lever for each revolution of the crank is adjustable by adjusting the distance of the crank pin from the center of the shaft, and whatever the length of the stroke, the relation between the progressive and retrograde movement is finely adjustable by the setting of the lever carrying the carbon brushes so that the amount of permanent change of position of the rheostat arm per second may be as little or as great as the nature of the dynamo field to be regulated is found to require. The field characteristics of some machines allow them to respond much quicker than others to the action of a rheostat and the adjustments of my regulator are such as to enable me not only to time the movement of the rheostat to the natural time element of the field, but also to force the field change by a greater or less temporary excess of rheostat movement and so reduce its time element, making the regulation much quicker than it otherwise could be.

The parts of the apparatus may be all secured to a slate panel as shown in Fig. 1 and constitute a voltage regulator adapted to be manufactured and put on the market in a compact form.

It will be understood that while I have described this apparatus applied to the regulation of the voltage it may be used equally well to regulate the current from a dynamo. It may also be used to regulate the voltage of an alternating current dynamo by regulating the field current of its exciting dynamo, the relay coil in that case being connected not to the mains of the dynamo to which the regulator rheostat is applied but to the alternating mains.

I claim:—

1. In a regulator for dynamo electric machines, the combination of a rheostat for governing the magnetic field and means for moving the rheostat arm with a series of steps, each step including a movement unequally in opposite directions.

2. In a regulator for dynamos the combination of a rheostat for governing the magnetic field and means for moving the arm of the rheostat with a series of steps each step including a forward movement and a retrograde movement of less extent than the forward movement.

3. In a regulator for dynamos the combination of a relay having a low voltage contact and a high voltage contact, a rheostat actuating means for producing a general movement of the rheostat arm in opposite directions and connected with said contacts and for producing a vibratory movement of the rheostat arm during its general movement, each vibration including an unequal forward and retrograde movement.

4. In a regulator for dynamos, the combination of a rheostat, a rheostat arm, a magnetic clutch capable of positive engagement having one of its clutch members connected to said arm, a rotatable shaft and means operated by said shaft for oscillating the free member of said magnetic clutch to produce an oscillation of said arm, an electric circuit including said magnetic clutch and a commutator and commutator brush for intermittently closing said circuit.

5. In a regulator for dynamos, the combination of a rheostat, a rheostat arm, a magnetic clutch capable of positive engagement having one of its clutch members connected to said arm, a rotatable shaft and means operated by said shaft for oscillating the free member of said magnetic clutch to produce an oscillation of said arm, an electric circuit including said magnetic clutch and a commutator and commutator brush for intermittently closing said circuit, said commutator being rotated by said shaft.

6. In a regulator for dynamos, the combination of a rheostat, a rheostat arm, a magnetic clutch capable of positive engagement having one of its clutch members connected with said arm, a rotatable shaft and means operated by said shaft for oscillating the free clutch member to produce an oscillation of said arm, a commutator on said shaft, a commutator brush therefor, and an electric circuit including said magnetic clutch, said brush, and a segment of said commutator.

7. In a regulator for dynamos the combination of a rheostat, a rheostat arm, a magnetic clutch capable of positive engagement having one of its clutch members connected with said arm, a rotatable shaft and means operated by said shaft for oscillating the free clutch member to produce an oscillation of said arm, a pair of commutators located on said shaft, brushes for said commutators, said commutators having opposing segments arranged to come alternately into contact with the brushes and two electric circuits, each including the magnetic clutch and one of the commutators and its brush, each commutator being connected with one of the main supply wires.

8. In a regulator for dynamos the combination of a rheostat, a rheostat arm, a magnetic clutch capable of positive engagement having one of its clutch members connected with said arm, a rotatable shaft and means operated by said shaft for oscillating the free clutch member to produce an oscillation of said arm, a pair of commutators located on said shaft, brushes for said commutators, said commutators having opposing segments arranged to come alternately into contact with the brushes and two electric circuits each including the magnetic clutch and one of the commutators and its brush and a common connecting member connecting with one of the supply wires and with each of said commutators.

9. In a regulator for dynamos, the combination of a rheostat, a rheostat arm, a magnetic clutch capable of positive engagement having one of its clutch members connected to said arm, a rotatable shaft and means operated by said shaft for oscillating the free clutch member to produce an oscillation of the arm, a relay having a low voltage contact and a high voltage contact, a pair of commutators located on said shaft and brushes for said commutators, said commutators having opposing segments arranged to come alternately into contact with their brushes and two electric circuits each including the magnetic clutch, one of the commutators and its brush, one of said contacts and a common connecting member connecting with one of the main supply wires.

10. In a regulator for dynamos the combination of a rheostat, a rheostat arm, a magnetic clutch capable of positive engagement having one of its clutch members connected to said arm, a rotatable shaft and means operated by said shaft for oscillating the free clutch member to produce an oscillation of the arm, a relay having a low voltage contact and a high voltage contact, a pair of commutator rings on said shaft having opposing segments, brushes for said commutators, a conducting ring between said commutator rings and generally insulated therefrom, but having an electrical connection with opposite segments in each commutator ring, a brush for said conducting ring, one terminal of the magnetic clutch connecting with one of the main supply wires and the other with the conducting ring brush and each of said contacts connecting with one of the commutator brushes.

11. In a regulator for dynamos the combination of a rheostat, a rheostat arm, a magnetic clutch capable of positive engagement having one of its clutch members connected to said arm, a rotatable shaft and means operated by said shaft for oscillating the free clutch member to produce an oscillation of the arm, a relay having a low voltage contact and a high voltage contact, a pair of commutator rings on said shaft having opposing semi-circular segments, brushes for said commutator rings, a conducting ring between said commutator rings and generally insulated therefrom, but having an electrical connection with opposite segments in each commutator ring, a brush for said conducting ring, one terminal of the magnetic clutch connecting with one of the main supply wires and the other with the conducting ring brush and each of said contacts connecting with one of the commutator brushes.

12. In a regulator for dynamos, the combination of a rheostat, a rheostat arm, a magnetic clutch capable of positive engagement having one of its clutch members connected with said arm, a crank arm on the free clutch member, a rotatable shaft, a crank disk thereon, a connecting rod connecting the crank arm and the crank disk for oscillating the free clutch member, an electric circuit including the magnetic clutch and means carried by said shaft for closing said circuit during a portion of the oscillation of the free clutch member.

13. In a regulator for dynamos, the combination of a rheostat, a rheostat arm, a magnetic clutch having one of its clutch members connected with said arm, a crank arm on the free clutch member, a rotatable shaft, a crank disk on the end of said shaft, a crank plate on said disk pivoted at one end and adjustably secured to the disk at the other end, a connecting rod connecting the crank plate with the crank arm for oscillating the free clutch member, an electric circuit including the magnetic clutch and means carried by said shaft for closing said circuit during a portion of the oscillation of the free clutch member.

14. A cylindrical rheostat having one substantially semi-cylindrical segment and the balance of its surface filled with small segments, a shaft and an arm on said shaft having at each end contact fingers adapted to slide on said segments, said fingers being electrically connected, a magnetic clutch having one of its clutch members secured to said shaft, means for oscillating the free member of said clutch and means for energizing said clutch to cause it to engage.

15. A cylindrical rheostat having one segment covering a little more than half of its surface and the balance of the surface filled with small segments, a shaft journaled axially in said rheostat, an arm on said shaft having at each end oppositely disposed contact fingers adapted to slide on said segments said fingers being electrically connected, a magnetic clutch composed of a disk of magnetic material secured to the shaft and a movable member consisting of an electro-magnet journaled on said shaft, means for oscillating said movable member, and means for energizing said magnet.

16. In a regulator for dynamos, the combination of a rheostat comprising a drum having rheostat segments on its exterior surface, an insulating panel having an opening therethrough, means for securing said drum to said panel, a shaft journaled in the axis of said drum and extending through the panel, a rheostat arm on said shaft, contact fingers on the ends of said arm adapted to slide on the surface of said segments and a magnetic clutch on said shaft.

17. In a regulator for dynamos the combination of a rheostat comprising a drum having rheostat segments on its exterior surface, and a screw threaded hub projecting from one end, an insulating panel having an opening therethrough for receiving said hub, a nut engaging the end of said hub for locking the drum in place, a shaft journaled axially in said drum and extending through said hub, a rheostat arm on said shaft, contact fingers on said arm adapted to slide on said segments and a magnetic clutch on said shaft.

18. In a regulator for dynamos the combination of a cylindrical rheostat, a rheostat arm, a shaft for said arm, a disk of magnetic material fixed on said shaft, a sleeve of magnetic material adapted to slide and rotate on said shaft adjacent to said disk, a magnet wire winding to said sleeve forming an electro-magnet and means for oscillating and energizing said magnet.

19. In a regulator for dynamos, the combination of a cylindrical rheostat, a rheostat arm, a shaft for said arm, a disk of magnetic material fixed on said shaft, a sleeve of magnetic material adapted to slide and rotate on said shaft forming an electro-magnet, an arm on said sleeve, a contact pin on said arm adapted to press against said disk and means for oscillating and energizing said magnet.

20. In a regulator for dynamos, the combination of a cylindrical rheostat, a rheostat arm, a shaft for said arm, a disk of magnetic material fixed on said shaft, a sleeve of magnetic material adapted to slide and rotate on said shaft adjacent to said disk, a magnet wire winding to said sleeve forming an electro-magnet, an arm on said sleeve, a contact pin on said arm adapted to press against said disk, a crank pin on said arm, a connecting rod pivoted to said crank pin, means for reciprocating said connecting rod and means for energizing said magnet.

21. In a regulator for dynamos the combination of a rheostat, a rheostat arm, a shaft therefor, a magnetic clutch having one of its clutch members secured to said shaft, a commutator shaft, means operated by said commutator shaft for oscillating the free member of said clutch, a pair of commutator rings, on said commutator shaft having opposing semi-circular sections, a conducting ring connecting with each of said commutator segments, brushes for said rings, a relay having a low voltage contact and a high voltage contact, a line extending from each of said contacts to one of said commutator brushes, a circuit breaker interposed in each of said lines, a circuit including the conducting ring brush, the magnetic clutch and one of the line wires, and an arm on the rheostat shaft adapted to contact with each of said circuit breakers when the rheostat arm moves beyond its operative limits in either direction.

22. In a regulator for dynamos the combination of a rheostat, a rheostat arm, a magnetic clutch having one of its clutch members connected to the rheostat arm, means for oscillating the free member of said clutch, a rotatable shaft, means actuated by said shaft for oscillating the free clutch member, a pair of commutator rings on said shaft, having opposing semi-circular commutator segments, a conducting ring between commutator rings electrically connected with said segments, brushes for said rings, a pivoted brush holding lever for said brushes having its pivoting center in the axis of the shaft, a clamp for the same and electrical circuits including the magnetic clutch and said brushes.

23. In a regulator for dynamos the combination of an insulating panel, a bushing extending through said panel, a shaft journaled axially in said bushing, a pair of commutator rings on said shaft having opposing semi-circular segments, a conducting ring between said commutator rings, a brush for each of said rings, a brush holding lever for said brushes journaled on said bushing, a handle for adjusting the position of said lever and a clamp for clamping it to said bushing.

In witness whereof I have hereunto set my hand this 30th day of April, 1909.

WILLIAM H. CHAPMAN.

Witnesses:
S. W. BATES,
ELEANOR W. DENNIS.